United States Patent
Ding et al.

(10) Patent No.: US 11,393,245 B2
(45) Date of Patent: Jul. 19, 2022

(54) TEXTURE DETECTION CIRCUIT, CHARGING CIRCUIT, DRIVING METHOD AND TOUCH DISPLAY PANEL

(71) Applicant: BOE TECHNOLOGY GROUP CO., LTD., Beijing (CN)

(72) Inventors: Xiaoliang Ding, Beijing (CN); Haisheng Wang, Beijing (CN); Lei Wang, Beijing (CN); Yunke Qin, Beijing (CN); Yingming Liu, Beijing (CN)

(73) Assignee: BOE Technology Group Co., LTD., Beijing (CN)

(*) Notice: Subject to any disclaimer, the term of this patent is extended or adjusted under 35 U.S.C. 154(b) by 0 days.

(21) Appl. No.: 17/256,047

(22) PCT Filed: May 25, 2020

(86) PCT No.: PCT/CN2020/092041
§ 371 (c)(1),
(2) Date: Dec. 24, 2020

(87) PCT Pub. No.: WO2020/238839
PCT Pub. Date: Dec. 3, 2020

(65) Prior Publication Data
US 2021/0124896 A1  Apr. 29, 2021

(30) Foreign Application Priority Data
May 27, 2019  (CN) .................. 201910447406.7

(51) Int. Cl.
*G06V 40/13* (2022.01)
*G06F 3/042* (2006.01)
(Continued)

(52) U.S. Cl.
CPC .......... *G06V 40/1318* (2022.01); *G06F 3/042* (2013.01); *G06F 3/0412* (2013.01); *H02J 7/007188* (2020.01)

(58) Field of Classification Search
CPC ............. G06K 9/0004; H02J 7/007188; G06F 3/0412; G06F 3/042; G06V 40/1318
See application file for complete search history.

(56) References Cited

U.S. PATENT DOCUMENTS

| 2016/0163259 A1 | 6/2016 | Kanda et al. |
| 2018/0122310 A1 | 5/2018 | Wang et al. |
| 2021/0210964 A1* | 7/2021 | Cao ..................... H02J 7/00045 |

FOREIGN PATENT DOCUMENTS

| CN | 203596003 U | 5/2014 |
| CN | 105489186 A | 4/2016 |

(Continued)

OTHER PUBLICATIONS

International search report of PCT application No. PCT/CN2020/092041 dated Aug. 26, 2020.
(Continued)

*Primary Examiner* — Stephen G Sherman
(74) *Attorney, Agent, or Firm* — Fay Sharpe LLP

(57) ABSTRACT

A texture detection circuit, a charging circuit, driving methods and a touch display panel are provided. The texture detection circuit includes a first photosensitive element and a switching sub-circuit. A first electrode of the first photosensitive element is connected with a signal readout line. A second electrode of the first photosensitive element is connected with the switching sub-circuit. The switching sub-circuit is connected with a reverse power end and a charging sub-circuit, and is configured to switch a connection state of the second electrode of the first photosensitive element between a first connection state and a second connection state. The first connection state is a state in which the second
(Continued)

electrode of the first photosensitive element is connected with the reverse power end. The second connection state is a state in which the second electrode of the first photosensitive element is connected with the charging sub-circuit.

17 Claims, 10 Drawing Sheets

(51) Int. Cl.
*H02J 7/00* (2006.01)
*G06F 3/041* (2006.01)

(56) References Cited

FOREIGN PATENT DOCUMENTS

| CN | 109147593 A | 1/2019 |
| CN | 109767714 A | 5/2019 |
| CN | 110163172 A | 8/2019 |

OTHER PUBLICATIONS

First office action of Chinese application No. 201910447406.7 dated Oct. 12, 2020.
Notification to grant patent right for invention of Chinese application No. 201910447406.7 dated Apr. 13, 2021.

* cited by examiner

R G B 101

TEXTURE DETECTION CIRCUIT, CHARGING CIRCUIT, DRIVING METHOD AND TOUCH DISPLAY PANEL

The present application is 371 of PCT Application No. PCT/CN2020/092041, filed on May 25, 2020, which claims priority to Chinese Patent Application No. 201910447406.7, filed on May 27, 2019 and titled "TEXTURE DETECTION CIRCUIT, CHARGING CIRCUIT, DRIVING METHOD, AND TOUCH DISPLAY PANEL", which are incorporated herein by reference in their entireties.

TECHNICAL FIELD

The present disclosure relates to a texture detection circuit, a charging circuit, driving methods and a touch display panel.

BACKGROUND

A touch display panel includes a plurality of pixel units arranged in an array, the pixel unit is provided with a pixel detection sub-circuit, the pixel detection sub-circuit is configured to convert a detected optical signal into an electrical signal and output the electrical signal to a processing module through a signal readout line, and the processing module is configured to determine whether there is a touch operation in a corresponding pixel region based on the electrical signal output by the signal readout line.

The pixel unit is provided with a light source for fingerprint detection, and the pixel detection sub-circuit in each pixel unit includes a photosensitive diode. When a finger presses on a surface of a display panel corresponding to a certain pixel unit, the light source in the pixel unit begins to emit light. Further, due to difference between valleys and ridges of the finger, the light emitted by the light source irradiates on the valleys and the ridges to produce different reflections, so that there is a difference in light intensity reflected onto the photosensitive diode in the pixel unit. The photosensitive diode may generate electric currents with different magnitudes based on the different light intensities and transmit the electric currents with different magnitudes to the processing module through the signal readout line, and then, the processing module may detect the ridges and the valleys by detecting the electric currents with different magnitudes, thereby realizing detection and recognition of the fingerprint.

SUMMARY

The present disclosure provides a texture detection circuit, a charging circuit, a method for driving the texture detection circuit, a method for driving the charging circuit, and a touch display panel. The technical solutions are as below.

In one aspect, a texture detection circuit is provided. The texture detection circuit includes a first photosensitive element and a switching sub-circuit.

A first electrode of the first photosensitive element is connected with a signal readout line, and a second electrode of the first photosensitive element is connected with the switching sub-circuit.

The switching sub-circuit is also connected with a reverse power end and a charging sub-circuit, and the switching sub-circuit is configured to switch a connection state of the second electrode of the first photosensitive element between a first connection state and a second connection state. The first connection state is a state in which the second electrode of the first photosensitive element is connected with the reverse power end, and the second connection state is a state in which the second electrode of the first photosensitive element is connected with the charging sub-circuit.

Optionally, the switching sub-circuit includes a second transistor and a third transistor.

A gate of the second transistor is connected with a second control signal terminal, a first electrode of the second transistor is connected with the reverse power end, and a second electrode of the second transistor is connected with the second electrode of the first photosensitive element.

A gate of the third transistor is connected with a third control signal terminal, a first electrode of the third transistor is connected with the second electrode of the first photosensitive element, and a second electrode of the third transistor is connected with the charging sub-circuit.

Optionally, the texture detection circuit further includes a first on-off sub-circuit.

The first on-off sub-circuit is connected in series between the first electrode of the first photosensitive element and the signal readout line.

Optionally, the first on-off sub-circuit includes a first transistor.

A gate of the first transistor is connected with a first control signal terminal, a first electrode of the first transistor is connected with the first electrode of the first photosensitive element, and a second electrode of the first transistor is connected with the signal readout line.

In another aspect, a charging circuit is provided. The charging circuit includes a charging sub-circuit and any texture detection circuit described in the first aspect. The second electrode of the first photosensitive element in the texture detection circuit is connected with the charging sub-circuit.

The texture detection circuit is configured to provide an electrical signal to the charging sub-circuit, and the electrical signal is acquired after the first photosensitive element converts a detected optical signal.

The charging sub-circuit is configured to store the electrical signal in a form of electric energy.

Optionally, the charging circuit includes a plurality of texture detection circuits connected in series.

In the plurality of texture detection circuits connected in series, the switching sub-circuit in a first texture detection circuit is connected with the charging sub-circuit, and other switching sub-circuits are connected with the charging sub-circuit through the texture detection circuits connected in series between the other switching sub-circuits and the charging sub-circuit.

The first texture detection circuit is any texture detection circuit located at both ends of the plurality of texture detection circuits connected in series, other switching sub-circuits are switching sub-circuits in other texture detection circuits, and the other texture detection circuits are texture detection circuits in the plurality of texture detection circuits connected in series other than the first texture detection circuit.

Optionally, the charging circuit further includes a second on-off sub-circuit and a first capacitor.

The second on-off sub-circuit is connected in series between the first electrode of the first photosensitive element and the charging sub-circuit.

One terminal of the first capacitor is connected in series between the first electrode of the first photosensitive element and the second on-off sub-circuit, the other terminal of the first capacitor is connected with a first power end. The first capacitor is configured to: get charged by the electrical signal from the first electrode of the first photosensitive element when the second on-off sub-circuit is in an off state, and discharge to the charging sub-circuit when the second on-off sub-circuit is in an on state.

Optionally, the second on-off sub-circuit includes a fourth transistor.

A gate of the fourth transistor is connected with a fourth control signal terminal, a first electrode of the fourth transistor is connected with the first electrode of the first photosensitive element, and a second electrode of the fourth transistor is connected with the charging sub-circuit.

Optionally, the charging circuit further includes a third on-off sub-circuit.

The third on-off sub-circuit is connected in series between the first electrode of the first photosensitive element and one terminal of the first capacitor.

Optionally, the third on-off sub-circuit includes a fifth transistor.

A gate of the fifth transistor is connected with a fifth control signal terminal, a first electrode of the fifth transistor is connected with the first electrode of the first photosensitive element, and a second electrode of the fifth transistor is connected with one terminal of the first capacitor.

Optionally, the charging circuit further includes a sensing sub-circuit 50.

The sensing sub-circuit is configured to sense a light intensity of ambient light in an environment where the charging circuit is located and output a light intensity sensing signal to a controller based on the light intensity, so that the controller controls, based on the light intensity sensing signal, time periods when one or more of the third on-off sub-circuit and the second on-off sub-circuit are in the on state.

Optionally, the sensing sub-circuit includes a second photosensitive element.

Optionally, the charging sub-circuit includes a battery.

In still another aspect, a method for driving a texture detection circuit is provided. The texture detection circuit includes a first photosensitive element and a switching sub-circuit, and the method for driving the texture detection circuit includes a charging stage and a texture detection stage.

At the texture detection stage, the switching sub-circuit is controlled to connect a second electrode of the first photosensitive element with a reverse power end.

At the charging stage, the switching sub-circuit is controlled to connect the second electrode of the first photosensitive element with a charging sub-circuit.

Optionally, the texture detection circuit further includes a first on-off sub-circuit, and the method for driving the texture detection circuit further includes:

at the texture detection stage, controlling the first on-off sub-circuit to connect a first electrode of the first photosensitive element with a signal readout line; and at the charging stage, controlling the first on-off sub-circuit to disconnect the first electrode of the first photosensitive element from the signal readout line.

In still another aspect, a method for driving a charging circuit is provided. The charging circuit includes a charging sub-circuit and a texture detection circuit, the texture detection circuit includes a first photosensitive element and a switching sub-circuit, and the method for driving the charging circuit includes:

at a charging stage, controlling the switching sub-circuit to connect a second electrode of the first photosensitive element with the charging sub-circuit, so that the first photosensitive element provides an electrical signal to the charging sub-circuit and the charging sub-circuit stores the electrical signal in form of electric energy, where the electrical signal is acquired after the first photosensitive element coverts a detected optical signal.

Optionally, the charging circuit further includes a first capacitor, a third on-off sub-circuit and a second on-off sub-circuit. The third on-off sub-circuit and the second on-off sub-circuit are connected in series between the first electrode of the first photosensitive element and the charging sub-circuit sequentially, and one terminal of the first capacitor is connected in series between the third on-off sub-circuit and the second on-off sub-circuit. The charging stage includes a first charging sub-stage and a second charging sub-stage.

At the first charging sub-stage, the third on-off sub-circuit is controlled to connect the first electrode of the first photosensitive element with one terminal of the first capacitor, so that the first photosensitive element charges the first capacitor.

At the second charging sub-stage, the second on-off sub-circuit is controlled to connect one terminal of the first capacitor with the charging sub-circuit, so that the first capacitor discharges to the charging sub-circuit.

A time period when the third on-off sub-circuit is in an on state and a time period when the second on-off sub-circuit is in an on state are non-overlapping.

In still another aspect, a touch display panel is provided. The touch display panel includes a charging circuit and a plurality of pixel units arranged in an array, and the charging circuit is any charging circuit described in the second aspect.

The charging circuit includes a texture detection circuit, and the texture detection circuit is disposed in a part of the pixel units or texture detection circuits are disposed in all of the pixel units.

Optionally, the texture detection circuit is disposed in each pixel unit, and the texture detection circuits in the plurality of pixel units are connected in series.

Optionally, the touch display panel further includes a controller, and the charging circuit further includes a sensing sub-circuit, a second on-off sub-circuit and a third on-off sub-circuit.

The sensing sub-circuit is configured to sense a light intensity of ambient light in an environment where the charging circuit is located and output a light intensity sensing signal to the controller based on the light intensity.

The controller is configured to control, based on the light intensity sensing signal, time periods when one or more of the third on-off sub-circuit and the second on-off sub-circuit are in the on state.

BRIEF DESCRIPTION OF THE DRAWINGS

In order to describe the technical solutions in embodiments of the present disclosure more clearly, the following briefly introduces accompanying drawings required for describing the embodiments. Apparently, the accompanying drawings in the following descriptions are merely some embodiments of the present disclosure, and persons of ordinary skill in the art may also derive other drawings from these accompanying drawings without creative efforts.

DETAILED DESCRIPTION

Figure 1:
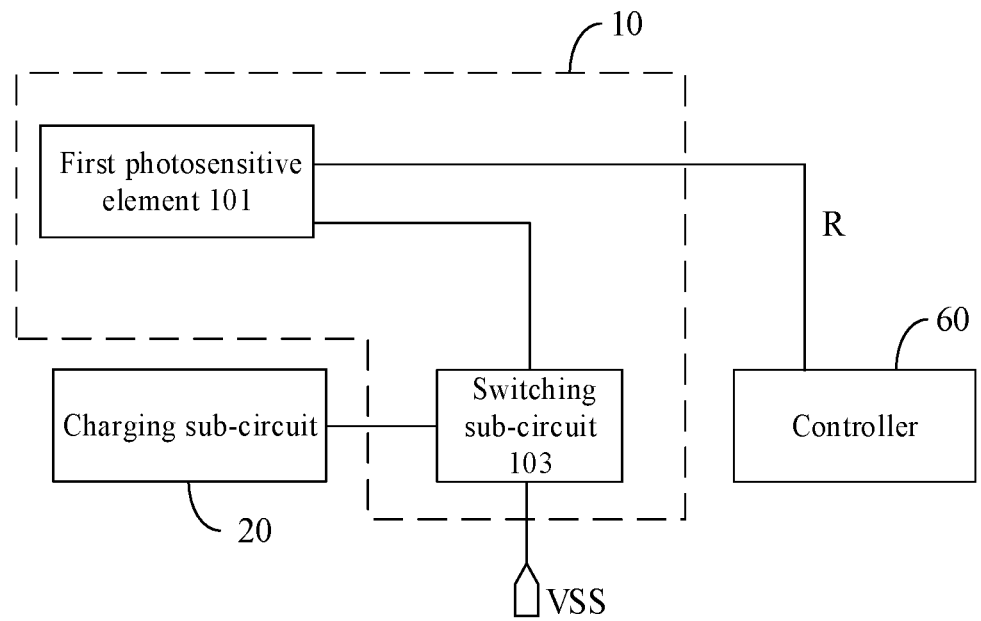
FIG. 1 is a structural schematic diagram of a texture detection circuit according to an embodiment of the present disclosure.

Embodiments of the present disclosure are described in further detail in combination with the accompanying drawings to present the objectives, technical solutions and advantages of the present disclosure more clearly.

Transistors used in all embodiments of the present disclosure may be thin film transistors or field effect transistors or other devices with same characteristics, and the transistor used in embodiments of the present disclosure mainly is an on-off transistor according to its function in a circuit. Since a source and a drain of the on-off transistor used herein are symmetrical, the source and the drain of the on-off transistor are interchangeable. In embodiments of the present disclosure, the source is referred to as a first electrode, and the drain is referred to as a second electrode. According to a form of the transistor in the drawing, it is specified that an intermediate terminal of the transistor is the gate, a signal input terminal is the source, and a signal output terminal is the drain. In addition, the on-off transistor used in embodiments of the present disclosure may include a P-type on-off transistor and an N-type on-off transistor. The P-type on-off transistor is on when the gate is at a low level and off when the gate is at a high level, and the N-type on-off transistor is on when the gate is at a high level and off when the gate is at a low level.

FIG. 1 is a structural schematic diagram of a texture detection circuit according to an embodiment of the present disclosure. As shown in FIG. 1, the texture detection circuit 10 may include a first photosensitive element 101 and a switching sub-circuit 103.

A first electrode of the first photosensitive element 101 is connected with a signal readout line R, and a second electrode of the first photosensitive element 101 is connected with the switching sub-circuit 103. The signal readout line R is connected with a controller 60.

The switching sub-circuit 103 is also connected with a reverse power end VSS and a charging sub-circuit 20, and the switching sub-circuit 103 is configured to switch a connection state of the second electrode of the first photosensitive element 101 between a first connection state and a second connection state. The first connection state is a state in which the second electrode of the first photosensitive element 101 is connected with the reverse power end VSS, and the second connection state is a state in which the second electrode of the first photosensitive element 101 is connected with the charging sub-circuit 20.

In summary, with the texture detection circuit provided by the embodiment of the present disclosure, the second electrode of the first photosensitive element is connected with the charging sub-circuit, and after the first photosensitive element converts an optical signal into an electrical signal, the electrical signal may be provided to the charging sub-circuit to enable the charging sub-circuit to store the electrical signal in the form of electric energy. That is, the electrical signal output by the first photosensitive element is used for texture detection at a texture detection stage; the electrical signal output by the first photosensitive element is used for charging at a charging stage. Compared with related arts, a utilization rate of the first photosensitive element can be improved on one hand, and optical energy can be converted into electric energy on the other hand, thereby improving a utilization rate of the optical energy. Moreover, when the electric energy is provided to a touch display panel for use, an electric energy requirement of the touch display panel on an external power supply can be reduced. Further, when the touch display panel is a display panel in a mobile terminal, an endurance capacity of the mobile terminal can be improved by converting the optical energy into the electric energy for the mobile terminal to use.

Figure 2:
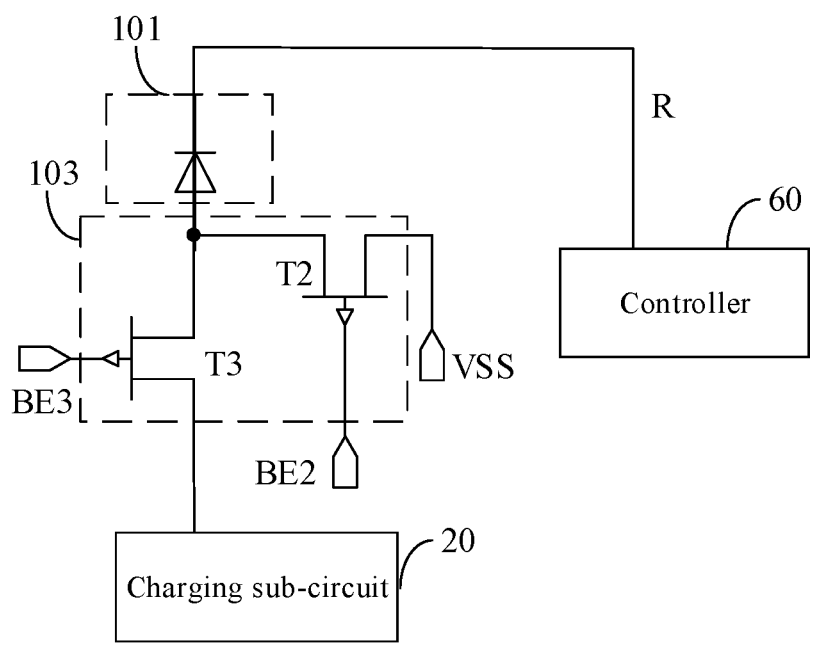
FIG. 2 is another structural schematic diagram of a texture detection circuit according to an embodiment of the present disclosure.

Optionally, as shown in FIG. 2, the first photosensitive element 101 may include a photosensitive diode.

Further, as shown in FIG. 2, the switching sub-circuit 103 may also be connected with a second control signal terminal BE2 and a third control signal terminal BE3. The second control signal terminal BE2 is used to provide a second control signal to the switching sub-circuit 103. The third control signal terminal BE3 is used to provide a third control signal to the switching sub-circuit 103. When the second control signal is at a valid level, the switching sub-circuit 103 connects the second electrode of the first photosensitive element 101 with the reverse power end VSS. At this time, the first photosensitive element 101 is in a reverse-biased state, and may be used for texture detection. When the third control signal is at a valid level, the switching sub-circuit 103 connects the second electrode of the first photosensitive element 101 with the charging sub-circuit 20. At this time, the second electrode of the first photosensitive element 101 provides the electrical signal to the charging sub-circuit 20, so that the charging sub-circuit 20 stores the electrical signal in the form of electric energy.

In an implementation, as shown in FIG. 2, the switching sub-circuit 103 may include a second transistor T2 and a third transistor T3. A gate of the second transistor T2 is connected with the second control signal terminal BE2, a first electrode of the second transistor T2 is connected with the reverse power end VSS, and a second electrode of the second transistor T2 is connected with the second electrode of the first photosensitive element 101. A gate of the third transistor T3 is connected with the third control signal terminal BE3, a first electrode of the third transistor T3 is connected with the second electrode of the first photosensitive element 101, and a second electrode of the third transistor T3 is connected with the charging sub-circuit 20.

Figure 3:
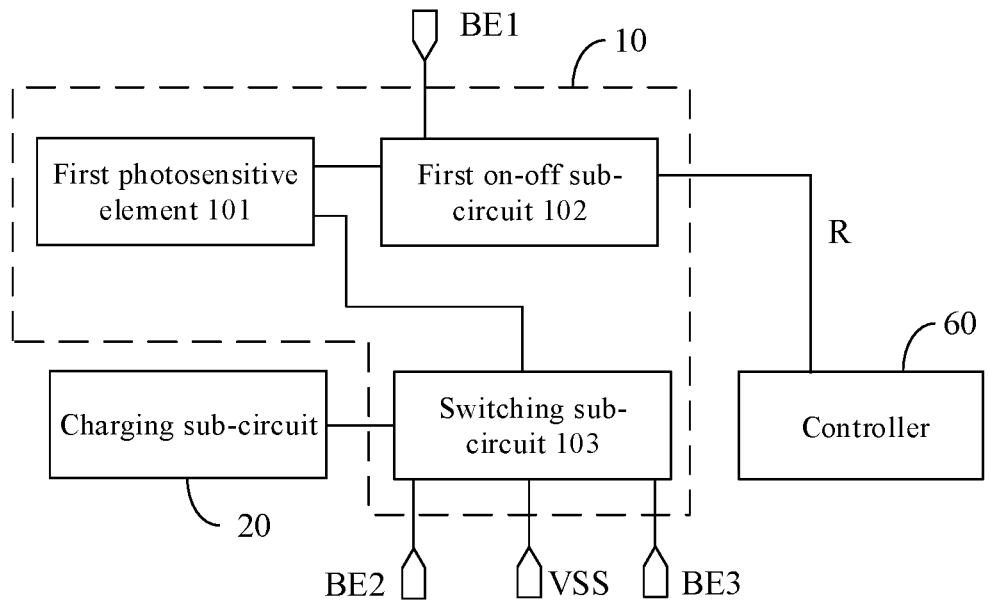
FIG. 3 is still another structural schematic diagram of a texture detection circuit according to an embodiment of the present disclosure.

Optionally, as shown in FIG. 3, the texture detection circuit 10 further includes a first on-off sub-circuit 102. The first on-off sub-circuit 102 is connected in series between the first electrode of the first photosensitive element 101 and the signal readout line. When the texture detection circuit 10 includes the first on-off sub-circuit 102, the first on-off sub-circuit 102 may control a connection state between the first photosensitive element 101 and the signal readout line.

For example, at the texture detection stage, the first on-off sub-circuit 102 may control to connect the first photosensitive element 101 with the signal readout line. At this time, the first electrode of the first photosensitive element 101 may provide a touch signal to the signal readout line R, so that the signal readout line transmits the electrical signal output by the first photosensitive element 101 to the controller 60 and the controller 60 performs texture detection based on the electrical signal. At the charging stage, the first on-off sub-circuit 102 may control to disconnect the first photosensitive element 101 from the signal readout line, so as to prevent the signal readout line from outputting the electrical signal and avoid reduction of an electric current output by the first photosensitive element 101 to the charging sub-circuit 20 due to electric current shunt. Thus, all of the electrical signal output by the first photosensitive element 101 is used to charge the charging sub-circuit 20, thereby ensuring a utilization rate of the electrical signal.

As shown in FIG. 3, the first on-off sub-circuit 102 may be connected with a first control signal terminal BE1, and the first control signal terminal BE1 is used to provide a first control signal to the first on-off sub-circuit 102 to control the first on-off sub-circuit 102 to be in an on state or an off state. Further, when the first on-off sub-circuit 102 is in the on state, the first on-off sub-circuit 102 connects the first electrode of the first photosensitive element 101 with the signal readout line R. When the first on-off sub-circuit 102 is in the off state, the first on-off sub-circuit 102 disconnects the first electrode of the first photosensitive element 101 from the signal readout line R.

Figure 4:
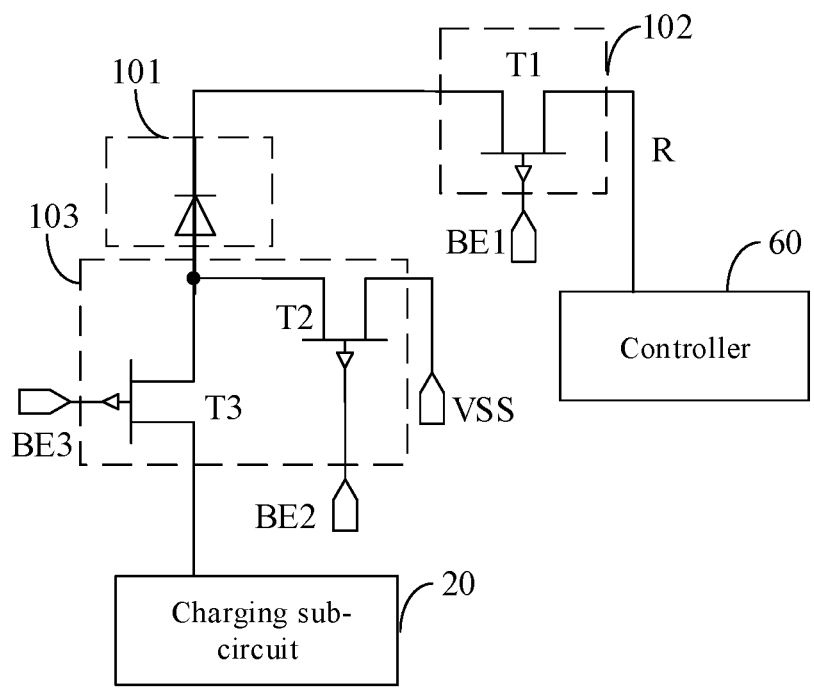
FIG. 4 is yet another structural schematic diagram of a texture detection circuit according to an embodiment of the present disclosure.

In an implementation, as shown in FIG. 4, the first on-off sub-circuit 102 may include a first transistor T1. A gate of the first transistor T1 is connected with the first control signal terminal BE1, a first electrode of the first transistor T1 is connected with the first electrode of the first photosensitive element 101, and a second electrode of the first transistor T1 is connected with the signal readout line R.

The first photosensitive element 101 may be used to detect light reflected by a texture (e.g., a fingerprint). Therefore, the texture detection circuit 10 may be applied to a texture detection scenario. For example, the texture detection circuit 10 may be disposed in a touch display panel, and is configured to detect the fingerprint of a finger pressing a surface of the touch display panel. At this time, the texture detection circuit 10 may be disposed in part or all of pixel units in the touch display panel. In an example, the touch display panel includes a plurality of pixel units arranged in an array, and the texture detection circuit 10 may be disposed in each pixel unit. In another example, a fingerprint module is disposed at a certain position of the touch display panel, and the texture detection circuit 10 may be integrated into the fingerprint module at this time.

Further, the texture is usually detected in a manner of periodic texture scan. Therefore, a working time period of the texture detection circuit includes a texture detection stage and a non-texture-detection stage. At the non-texture-detection stage, the texture detection circuit provided by embodiments of the present disclosure may provide the electrical signal to the charging sub-circuit, and the charging sub-circuit may store the electrical signal in the form of electric energy. Therefore, the texture detection circuit provided by embodiments of the present disclosure may realize time-division multiplexing, which not only improves utilization rates of the texture detection circuit and the first photosensitive element, but also improves the utilization rate of the optical energy.

In summary, with the texture detection circuit provided by the embodiments of the present disclosure, the second electrode of the first photosensitive element is connected with the charging sub-circuit, and after the first photosensitive element converts the optical signal into the electrical signal, the electrical signal may be provided to the charging sub-circuit to enable the charging sub-circuit to store the electrical signal in the form of electric energy. That is, at the texture detection stage, the electrical signal output by the first photosensitive element is used for texture detection; at the charging stage, the electrical signal output by the first photosensitive element is used for charging. Compared with related arts, the utilization rate of the first photosensitive element can be improved on one hand, and the optical energy can be converted into the electric energy on the other hand, thereby improving the utilization rate of the optical energy. Moreover, when the electric energy is provided to a touch display panel for use, an electric energy requirement of the touch display panel on an external power supply can be reduced. Further, when the touch display panel is a display panel in a mobile terminal, an endurance capacity of the mobile terminal can be improved by converting the optical energy into the electric energy for the mobile terminal to use.

Figure 5:
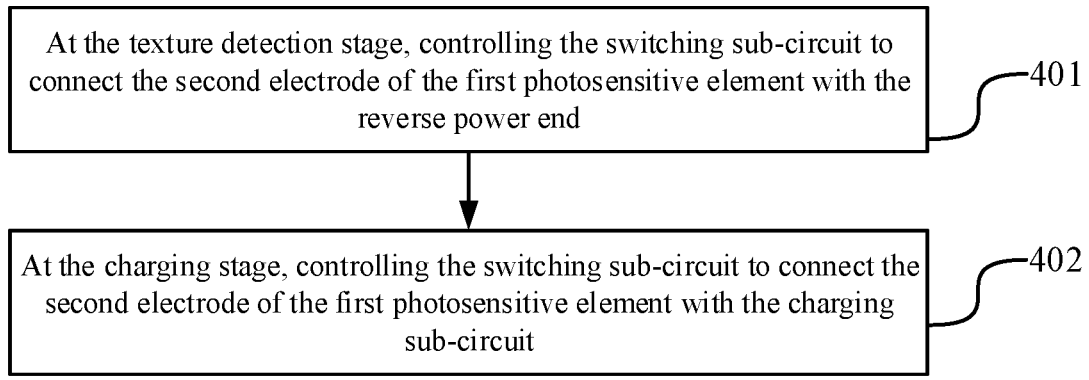
FIG. 5 is a flowchart of a method for driving a texture detection circuit according to an embodiment of the present disclosure.

An embodiment of the present disclosure provides a method for driving a texture detection circuit. The method or driving the texture detection circuit may be applied to drive the texture detection circuit provided by embodiments of the present disclosure. As shown in FIG. 5, the method for driving the texture detection circuit may include a charging stage and a texture detection stage.

In step 401, at the texture detection stage, the switching sub-circuit is controlled to connect the second electrode of the first photosensitive element with the reverse power end.

In step 402, at the charging stage, the switching sub-circuit is controlled to connect the second electrode of the first photosensitive element with the charging sub-circuit.

In step 401, the second control signal terminal may be controlled to provide a second control signal at a valid level to the switching sub-circuit, so that the switching sub-circuit connects the second electrode of the first photosensitive element with the reverse power end. Further, the third control signal terminal may be controlled to provide a third control signal at an invalid level to the switching sub-circuit, so that the switching sub-circuit disconnects the second electrode of the first photosensitive element from the charging sub-circuit.

In step 402, the second control signal terminal may be controlled to provide a second control signal at an invalid level to the switching sub-circuit, so that the switching sub-circuit disconnects the second electrode of the first photosensitive element with the reverse power end. Further, the third control signal terminal may be controlled to provide a third control signal at a valid level to the switching sub-circuit, so that the switching sub-circuit connects the second electrode of the first photosensitive element with the charging sub-circuit. When the second electrode of the first photosensitive element is connected with the charging sub-circuit, the first electrode of the first photosensitive element may be connected with another end of the charging sub-circuit, that is, the first photosensitive element and the charging sub-circuit form a closed loop.

Further, when the texture detection circuit further includes a first on-off sub-circuit, the method for driving the texture detection circuit further includes the following processes.

At the texture detection stage, the first on-off sub-circuit is controlled to connect the first electrode of the first photosensitive element with the signal readout line. For example, the first control signal terminal is controlled to provide a first control signal at a valid level to the first on-off sub-circuit, so that the first on-off sub-circuit is in the on state and the first electrode of the first photosensitive element is connected with the signal readout line.

At the charging stage, the first on-off sub-circuit is controlled to disconnect the first electrode of the first photosensitive element from the signal readout line. For example, the first control signal terminal is controlled to provide a first control signal at an invalid level to the first on-off sub-circuit, so that the first on-off sub-circuit is in the off state and the first electrode of the first photosensitive element is disconnected from the signal readout line.

In summary, with the method for driving the texture detection circuit provided by the embodiment of the present disclosure, the second electrode of the first photosensitive element is connected with the charging sub-circuit, and after the first photosensitive element converts the optical signal into the electrical signal, the electrical signal may be provided to the charging sub-circuit to enable the charging sub-circuit to store the electrical signal in the form of electric energy. That is, at the texture detection stage, the electrical signal output by the first photosensitive element is used for texture detection; at the charging stage, the electrical signal output by the first photosensitive element is used for charging. Compared with related arts, the utilization rate of the first photosensitive element can be improved on one hand, and the optical energy can be converted into the electric energy on the other hand, thereby improving the utilization rate of the optical energy. Moreover, when the electric energy is provided to a touch display panel for use, an electric energy requirement of the touch display panel on an external power supply can be reduced. Further, when the touch display panel is a display panel in a mobile terminal, an endurance capacity of the mobile terminal can be improved by converting the optical energy into the electric energy for the mobile terminal to use.

Figure 6:
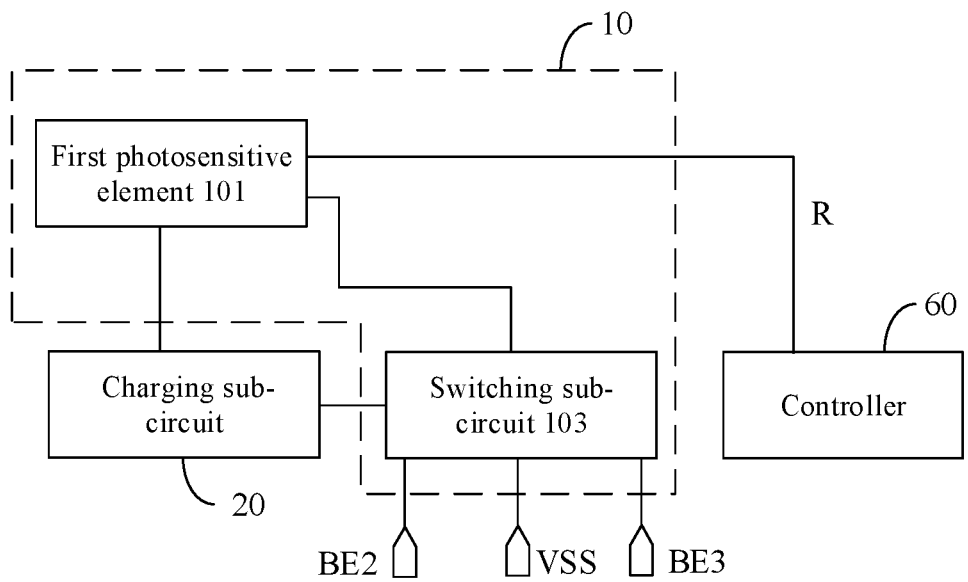
FIG. 6 is a structural schematic diagram of a charging circuit according to another embodiment of the present disclosure.

An embodiment of the present disclosure provides a charging circuit. As shown in FIG. 6, the charging circuit may include a charging sub-circuit 20 and the texture detection circuit 10 provided by embodiments of the present disclosure. The second electrode of the first photosensitive element 101 in the texture detection circuit 10 is connected with the charging sub-circuit 20. At this time, the first photosensitive element 101, the switching sub-circuit 103 and the charging sub-circuit 20 may form a closed loop.

The texture detection circuit 10 is configured to provide an electrical signal to the charging sub-circuit 20, and the electrical signal is acquired after the first photosensitive element 101 converts a detected optical signal. The electrical signal may be a photocurrent acquired through conversion of the optical signal.

The charging sub-circuit 20 is configured to store the electrical signal in the form of electric energy. Optionally, the charging sub-circuit 20 may include a battery.

In summary, with the charging circuit provided by the embodiment of the present disclosure, the second electrode of the first photosensitive element is connected with the charging sub-circuit, and after the first photosensitive element converts the optical signal into the electrical signal, the electrical signal may be provided to the charging sub-circuit to enable the charging sub-circuit to store the electrical signal in the form of electric energy. That is, at the texture detection stage, the electrical signal output by the first photosensitive element is used for texture detection; at the charging stage, the electrical signal output by the first photosensitive element is used for charging. Compared with related arts, the utilization rate of the first photosensitive element can be improved on one hand, and the optical energy can be converted into the electric energy on the other hand, thereby improving the utilization rate of the optical energy. Moreover, when the electric energy is provided to a touch display panel for use, an electric energy requirement of the touch display panel on an external power supply can be reduced. Further, when the touch display panel is a display panel in a mobile terminal, an endurance capacity of the mobile terminal can be improved by converting the optical energy into the electric energy for the mobile terminal to use.

Figure 7:
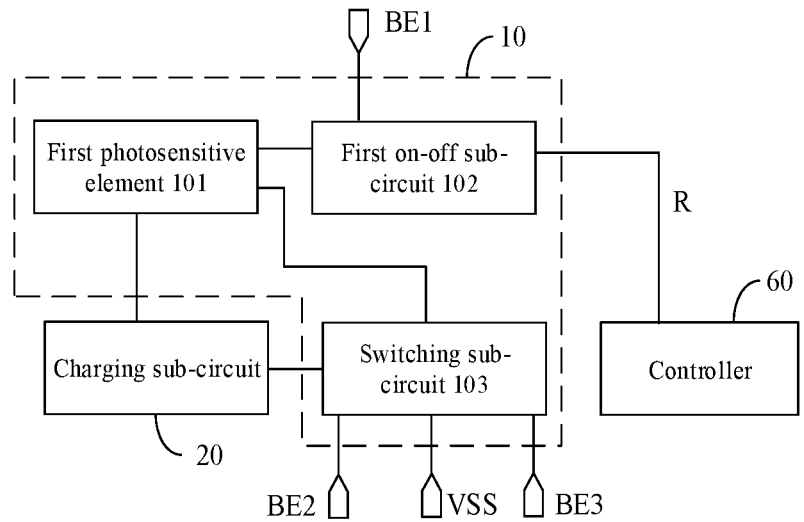
FIG. 7 is another structural schematic diagram of a charging circuit according to another embodiment of the present disclosure.

Optionally, as shown in FIG. 7, the texture detection circuit 10 may further include a first on-off sub-circuit 102.

Further, the charging circuit may include one or more texture detection circuits 10. When the charging circuit includes one texture detection circuit 10, the charging sub-circuit 20 is connected in series with the texture detection circuit 10. When the charging circuit includes a plurality of texture detection circuits 10, the charging sub-circuit 20 may be connected with each texture detection circuit 10 independently.

In a possible implementation, the charging circuit may include one charging sub-circuit 20 and a plurality of texture detection circuits 10, and each texture detection circuit 10 may be connected with the charging sub-circuit 20.

In another possible implementation, the charging circuit may include a plurality of charging sub-circuits 20 and a plurality of texture detection circuits 10, and each charging sub-circuit 20 is connected with one texture detection circuit 10 independently. For example, each texture detection circuit 10 may be connected with one battery independently. Further, when the texture detection circuit 10 is disposed in a pixel unit of a touch display panel, the battery connected to the texture detection circuit 10 may also be disposed in the pixel unit where the texture detection circuit 10 is located, or the battery may be disposed in a frame region of the touch display panel.

Figure 8:
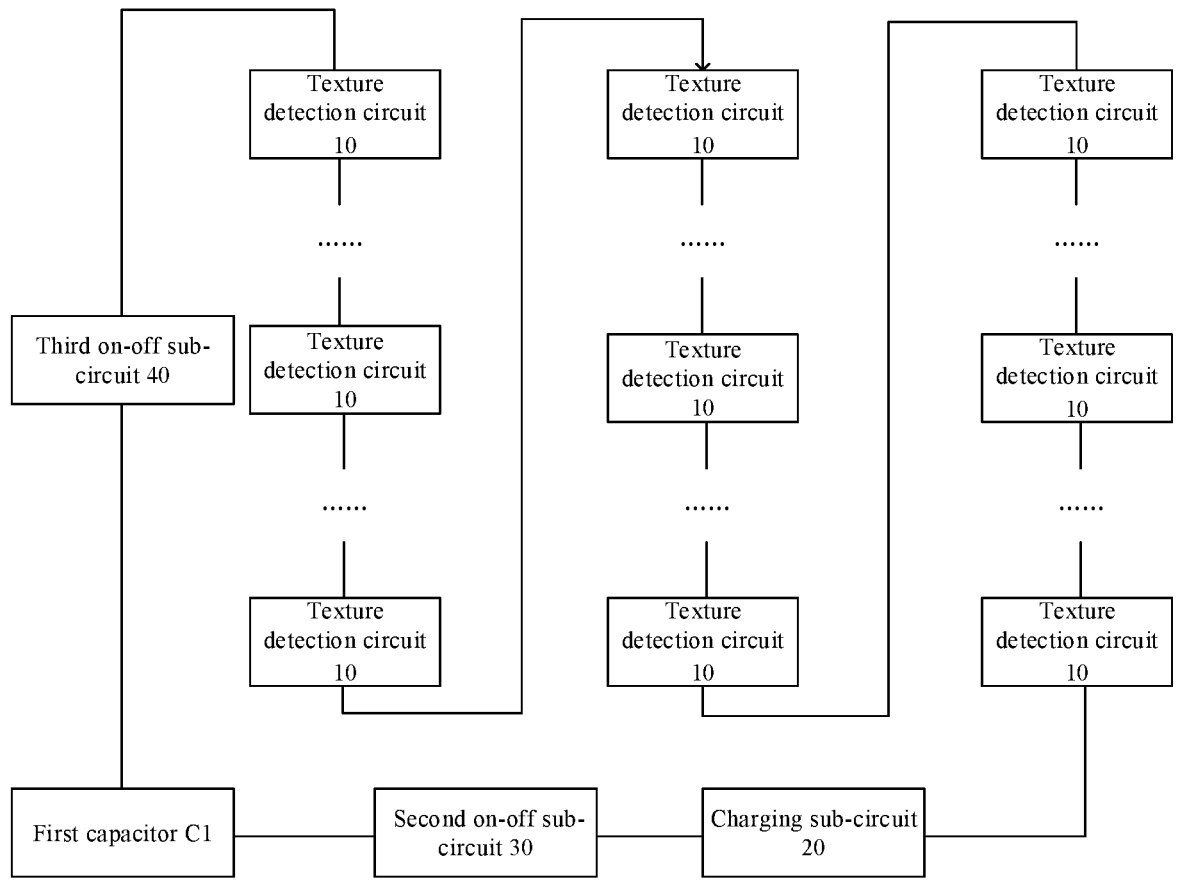
FIG. 8 is still another structural schematic diagram of a charging circuit according to another embodiment of the present disclosure.

In still another possible implementation, the charging circuit may include a plurality of texture detection circuits 10. The plurality of texture detection circuits 10 may be divided into one or more groups of texture detection circuits 10, and each group of texture detection circuits 10 may include a plurality of texture detection circuits 10 connected in series. When the charging circuit includes one charging sub-circuit 20, the charging sub-circuit 20 may be connected in series with each group of texture detection circuits 10. When the charging circuit includes a plurality of charging sub-circuits 20, each charging sub-circuit 20 may be connected with one group of texture detection circuits 10 independently. For example, as shown in FIG. 8, when the charging circuit includes one charging sub-circuit 20 and a plurality of texture detection circuits 10 and the texture detection circuit 10 is disposed in each pixel unit of the touch display panel, the texture detection circuits 10 in all pixel units may be connected in series in one loop. At this time, one charging sub-circuit 20 may also be connected in series in the loop, and the charging sub-circuit 20 may be disposed in the frame region of the touch display panel.

When a plurality of texture detection circuits 10 are connected in series, a voltage drop on the plurality of texture detection circuits 10 connected in series is large, so a charging voltage for charging the charging sub-circuit 20 may be increased when the plurality of texture detection circuits 10 connected in series are used to charge the charging sub-circuit 20, thereby improving an efficiency of charging the charging sub-circuit 20.

The plurality of texture detection circuits 10 connected in series may be implemented as follows: for a plurality of texture detection circuits 10 connected in series in each group of texture detection circuits 10, the switching sub-circuit 103 in a first texture detection circuit 10 is connected with the charging sub-circuit 20, and other switching sub-circuits 103 are connected with the charging sub-circuit 20 through the texture detection circuits 10 connected in series between the other switching sub-circuits 103 and the charging sub-circuit 20. The first texture detection circuit 10 is any texture detection circuit 10 located at both ends of a plurality of texture detection circuits 10 connected in series, other switching sub-circuits 103 are switching sub-circuits 103 in other texture detection circuits 10, and other texture detection circuits 10 are texture detection circuits 10 in a plurality of texture detection circuits 10 connected in series other than the first texture detection circuit 10.

Figure 10:
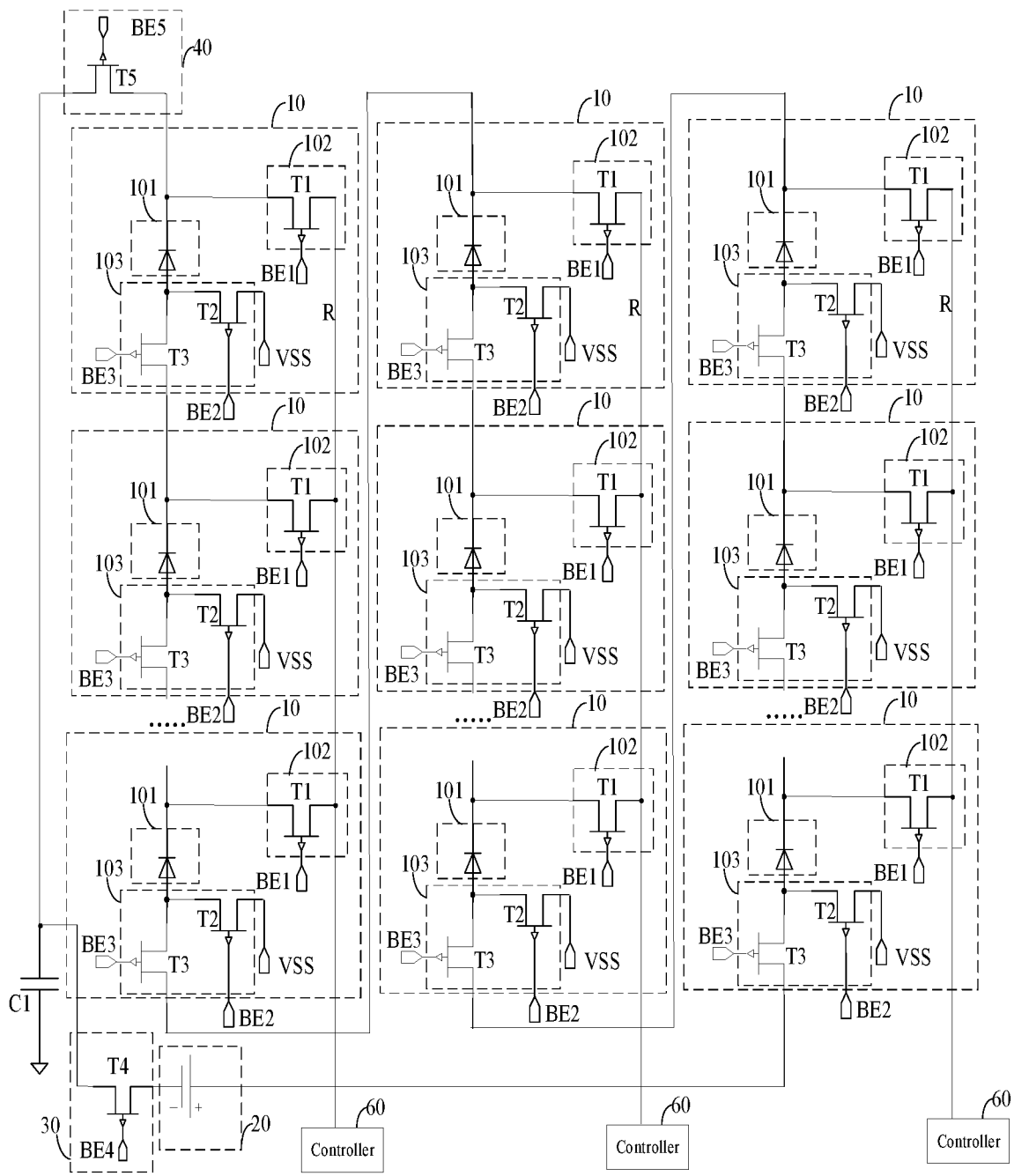
FIG. 10 is still another structural schematic diagram of a charging circuit according to another embodiment of the present disclosure.

Exemplarily, when the structure of the texture detection circuit 10 is a structure shown in FIG. 4 and the charging sub-circuit 20 is a battery, as shown in FIG. 8, a plurality of texture detection circuits 10 connected in series and the battery form a closed loop, and the texture detection circuits 10 located at both ends of the plurality of texture detection circuits 10 connected in series are connected with a positive electrode and a negative electrode of the battery respectively. Further, among the plurality of texture detection circuits 10 connected in series, the texture detection circuit 10 connected with the positive electrode of the battery is the first texture detection circuit 10, and the texture detection circuits 10 in the plurality of texture detection circuits 10 connected in series other than the first texture detection circuit 10 are all referred to as other texture detection circuits 10. As shown in FIG. 10, the second electrode of the third transistor T3 in the first texture detection circuit 10 is connected with the positive electrode of the battery, and any of other texture detection circuits 10 is connected with the negative electrode of the battery through the texture detection circuit(s) 10 connected between the any of other texture detection circuits 10 and the negative electrode of the battery. Further, for every two adjacent texture detection circuits 10 in the plurality of texture detection circuits 10 connected in series, the second electrode of the third transistor T3 in one texture detection circuit is connected with the first electrode of the first photosensitive element 101 in the other texture detection circuit.

Figure 9:
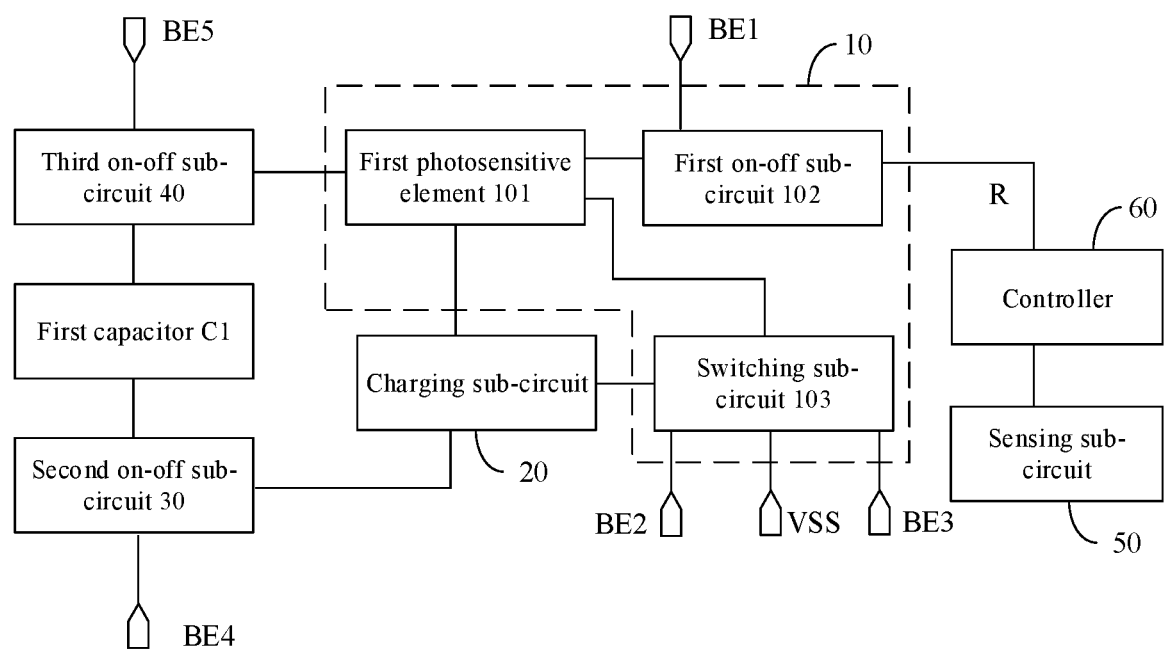
FIG. 9 is still another structural schematic diagram of a charging circuit according to another embodiment of the present disclosure.

Further, as shown in FIGS. 8-10, the charging circuit may further include a second on-off sub-circuit 30 and a first capacitor C1.

The second on-off sub-circuit 30 is connected in series between the first electrode of the first photosensitive element 101 and the charging sub-circuit 20. The second on-off sub-circuit 30 has an on state and an off state. When the second on-off sub-circuit 30 is in the on state, the first electrode of the first photosensitive element 101 is connected with the charging sub-circuit 20; when the second on-off sub-circuit 30 is in the off state, the first electrode of the first photosensitive element 101 is disconnected from the charging sub-circuit 20.

One terminal of the first capacitor C1 is connected in series between the first electrode of the first photosensitive element 101 and the second on-off sub-circuit 30, and the other terminal of the first capacitor C1 is connected with a first power end. The first capacitor C1 is configured to: charge with the electrical signal from the first electrode of the first photosensitive element 101 when the second on-off sub-circuit 30 is in the off state, and discharge to the charging sub-circuit 20 when the second on-off sub-circuit 30 is in the on state. The other terminal of the first capacitor C1 may be grounded.

Since the photocurrent output by the first photosensitive element 101 is usually small, when the charging circuit includes the second on-off sub-circuit 30 and the first capacitor C1, the photocurrent output by the first photosensitive element 101 may be firstly used to charge the first capacitor C1; when the first capacitor C1 is charged to be in a relatively good charging state, the charging sub-circuit 20 is charged by the first capacitor C1, thereby improving the efficiency of charging the charging sub-circuit 20.

Optionally, as shown in FIG. 9, the second on-off sub-circuit 30 may also be connected with a fourth control signal terminal BE4. The fourth control signal terminal BE4 is used to provide a fourth control signal to the second on-off sub-circuit 30 so as to control the second on-off sub-circuit 30 to be in the on or off state. Further, when the second on-off sub-circuit 30 is in the off state, the first electrode of the first photosensitive element 101 is connected with the first capacitor C1, and the first electrode of the first photosensitive element 101 may provide an electrical signal to the first capacitor C1 at this time. When the second on-off sub-circuit 30 is in the on state, the first electrode of the first capacitor C1 is connected with the charging sub-circuit 20, i.e., the first capacitor C1 is connected with the charging sub-circuit 20, and the first electrode of the first photosensitive element 101 and the first capacitor C1 may each provide an electrical signal to the charging sub-circuit 20 at this time.

In an implementation, as shown in FIG. 10, the second on-off sub-circuit 30 may include a fourth transistor T4. A gate of the fourth transistor T4 is connected with the fourth control signal terminal BE4, a first electrode of the fourth transistor T4 is connected with the first electrode of the first photosensitive element 101, and a second electrode of the fourth transistor T4 is connected with the charging sub-circuit 20.

Further, as shown in FIGS. 8-10, the charging circuit may further include a third on-off sub-circuit 40. The third on-off sub-circuit 40 is connected in series between the first electrode of the first photosensitive element 101 and one terminal of the first capacitor C1, and configured to control the first electrode of the first photosensitive element 101 to be connected with or disconnected from the first capacitor C1.

Optionally, as shown in FIG. 9, the third on-off sub-circuit 40 may also be connected with a fifth control signal terminal BE5. The fifth control signal terminal BE5 is used to provide a fifth control signal to the third on-off sub-circuit 40 so as to control the third on-off sub-circuit 40 to be in the on or off state. Further, when the third on-off sub-circuit 40 is in the on state, the first electrode of the first photosensitive element 101 is connected with the first capacitor C1, and at this time, the first electrode of the first photosensitive element 101 may provide an electrical signal to the first capacitor C1 to charge the first capacitor C1. When the third on-off sub-circuit 40 is in the off state, the first electrode of the first photosensitive element 101 is disconnected from the first capacitor C1, and the first electrode of the first photosensitive element 101 cannot provide any electrical signal to the first capacitor C1 at this time.

Further, a time period when the third on-off sub-circuit 40 is in the on state and a time period when the second on-off sub-circuit 30 is in the on state may be non-overlapping. In this case, in the time period when the third on-off sub-circuit 40 is in the on state, all of the photocurrent may be used to charge the first capacitor C1; in the time period when the second on-off sub-circuit 30 is in the on state, the electrical signal for charging the charging sub-circuit 20 is completely from the first capacitor C1, thereby further improving an efficiency in charging the battery.

Exemplarily, the controller 60 may control the time period when the third on-off sub-circuit 40 is in the on state and the time period when the second on-off sub-circuit 30 is in the on state, and the controller 60 may store an upper limit threshold of a reference voltage and a lower limit threshold of the reference voltage. The upper limit threshold of the reference voltage is greater than the lower limit threshold of the reference voltage. At the charging stage, firstly, the third on-off sub-circuit 40 may be controlled to be in the on state and the second on-off sub-circuit 30 may be controlled to be in the off state, so as to charge the first capacitor C1 with the photocurrent from the first photosensitive element 101. When a level of the first capacitor C1 is charged to the upper limit threshold of the reference voltage, the third on-off sub-circuit 40 is controlled to be in the off state and the second on-off sub-circuit 30 is controlled to be in the on state, so as to charge the charging sub-circuit 20 by the first capacitor C1. Further, when the level of the first capacitor C1 decreases to the lower limit threshold of the reference voltage, the second on-off sub-circuit 30 is controlled to be in the off state. Then, the third on-off sub-circuit 40 is controlled to be in the on state. The above processes are repeated to realize a procedure of charging the charging sub-circuit 20. The first capacitor C1 may be always in a relatively good charging state by controlling the on and off states of the second on-off sub-circuit 30 and the third on-off sub-circuit 40 in this manner, thereby ensuring the efficiency in charging the charging sub-circuit 20.

As shown in FIG. 10, the third on-off sub-circuit 40 may include a fifth transistor T5. A gate of the fifth transistor T5 is connected with the fifth control signal terminal BE5, a first electrode of the fifth transistor T5 is connected with the first electrode of the first photosensitive element 101, and a second electrode of the fifth transistor T5 is connected with one terminal of the first capacitor C1.

Further, as shown in FIG. 9, the charging circuit may further include a sensing sub-circuit 50. The sensing sub-circuit 50 is configured to sense a light intensity of ambient light in an environment where the charging circuit is located and output a light intensity sensing signal to the controller 60 based on the light intensity, so that the controller 60 controls, based on the light intensity sensing signal, time periods when one or more of the third on-off sub-circuit 40 and the second on-off sub-circuit 30 are in the on state. The sensing sub-circuit 50 may be disposed in a frame region of a touch display panel. Further, the sensing sub-circuit 50 may include a second photosensitive element.

The light intensity of ambient light may affect the magnitude of the photocurrent and further affect a speed of charging the first capacitor C1, and the intensity of the ambient light is positively correlated with the charging speed. The ambient light is detected and the time periods when one or more of the third on-off sub-circuit 40 and the second on-off sub-circuit 30 are in the on state are controlled based on the light intensity of the ambient light, thereby improving the efficiency in charging the battery.

It is to be noted that, in a case that the charging circuit includes a plurality of texture detection circuits, output situations of the first control signal terminal BE1, the second control signal terminal BE2, the third control signal terminal BE3 and the reverse power end VSS which are connected to the plurality of texture detection circuits may be controlled according to actual needs, which will not be specifically limited in embodiments of the present disclosure.

In summary, with the charging circuit provided by embodiments of the present disclosure, the second electrode of the first photosensitive element is connected with the charging sub-circuit, and after the first photosensitive element converts the optical signal into the electrical signal, the electrical signal may be provided to the charging sub-circuit to enable the charging sub-circuit to store the electrical signal in the form of electric energy. That is, at the texture detection stage, the electrical signal output by the first photosensitive element is used for texture detection; at the charging stage, the electrical signal output by the first photosensitive element is used for charging. Compared with related arts, the utilization rate of the first photosensitive element can be improved on one hand, and the optical energy can be converted into the electric energy on the other hand, thereby improving the utilization rate of the optical energy. Moreover, when the electric energy is provided to a touch display panel for use, an electric energy requirement of the touch display panel on an external power supply can be reduced. Further, when the touch display panel is a display panel in a mobile terminal, an endurance capacity of the mobile terminal can be improved by converting the optical energy into the electric energy for the mobile terminal to use.

An embodiment of the present disclosure provides a method for driving a charging circuit. The method for driving the charging circuit may be applied to drive the charging circuit provided by embodiments of the present disclosure. The charging circuit includes a charging sub-circuit and a texture detection circuit, and the texture detection circuit includes a first photosensitive element and a switching sub-circuit. For example, the charging circuit may be the charging circuit shown in any one of FIGS. 6-10. The method for driving the charging circuit may include following process.

At the charging stage, the switching sub-circuit is controlled to connect the second electrode of the first photosensitive element with the charging sub-circuit, so that the first photosensitive element provides an electrical signal to the charging sub-circuit and the charging sub-circuit stores the electrical signal in a form of electric energy. The electrical signal is acquired after the first photosensitive element coverts a detected optical signal.

In summary, with the method for driving the charging circuit provided by the embodiment of the present disclosure, the second electrode of the first photosensitive element is connected with the charging sub-circuit, and after the first photosensitive element converts the optical signal into the electrical signal, the electrical signal may be provided to the charging sub-circuit to enable the charging sub-circuit to store the electrical signal in the form of electric energy. That is, at the texture detection stage, the electrical signal output by the first photosensitive element is used for texture detection; at the charging stage, the electrical signal output by the first photosensitive element is used for charging. Compared with related arts, the utilization rate of the first photosensitive element can be improved on one hand, and the optical energy can be converted into the electric energy on the other hand, thereby improving the utilization rate of the optical energy. Moreover, when the electric energy is provided to a touch display panel for use, an electric energy requirement of the touch display panel on an external power supply can be reduced. Further, when the touch display panel is a display panel in a mobile terminal, an endurance capacity of the mobile terminal can be improved by converting the optical energy into the electric energy for the mobile terminal to use.

The method for driving the charging circuit may further include a texture detection stage. At the texture detection stage, the switching sub-circuit is controlled to connect the second electrode of the first photosensitive element with the reverse power end, and the first on-off sub-circuit is controlled to connect the first electrode of the first photosensitive element with the signal readout line. Optionally, the texture detection stage and the charging stage may take place in time-division manner.

Optionally, in a case that the texture detection circuit further includes a first on-off sub-circuit, at the charging stage, the first on-off sub-circuit may be controlled to disconnect the first electrode of the first photosensitive element from the signal readout line.

Figure 11:
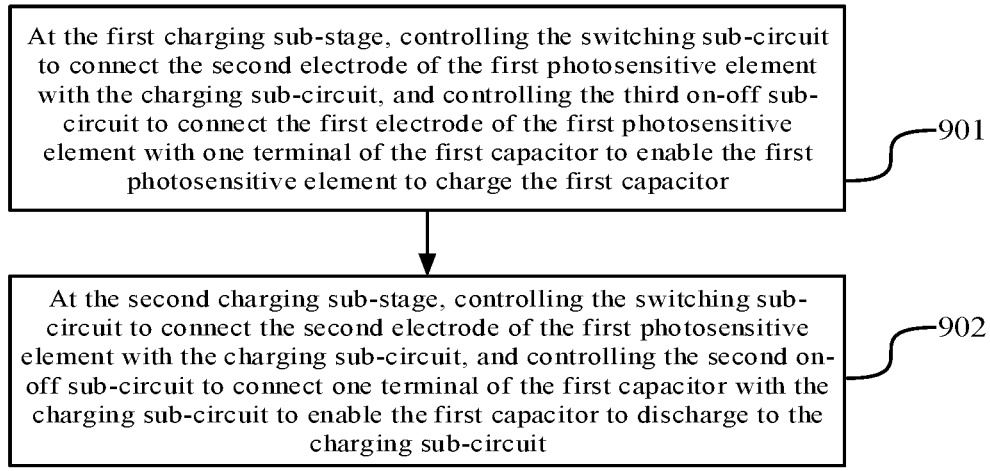
FIG. 11 is a flowchart of a method for driving a charging circuit according to an embodiment of the present disclosure.

Further, the charging circuit further includes a first capacitor, and a third on-off sub-circuit and a second on-off sub-circuit sequentially connected in series between the first electrode of the first photosensitive element and the charging sub-circuit, where one terminal of the first capacitor is connected in series between the third on-off sub-circuit and the second on-off sub-circuit. For example, the charging circuit may be the charging circuit shown in FIG. 10. At this time, the charging stage may include a first charging sub-stage and a second charging sub-stage. As shown in FIG. 11, the method may include the following steps.

In step 901, at the first charging sub-stage, the switching sub-circuit is controlled to connect the second electrode of the first photosensitive element with the charging sub-circuit, and the third on-off sub-circuit is controlled to connect the first electrode of the first photosensitive element with one terminal of the first capacitor to enable the first photosensitive element to charge the first capacitor.

In step 902, at the second charging sub-stage, the switching sub-circuit is controlled to connect the second electrode of the first photosensitive element with the charging sub-circuit, and the second on-off sub-circuit is controlled to connect one terminal of the first capacitor with the charging sub-circuit to enable the first capacitor to discharge to the charging sub-circuit.

Optionally, a time period when the third on-off sub-circuit is in the on state and a time period when the second on-off sub-circuit is in the on state may be non-overlapping. Correspondingly, at the first charging sub-stage, the second on-off sub-circuit may be controlled to disconnect one terminal of the first capacitor from the charging sub-circuit. At the second charging sub-stage, the third on-off sub-circuit may be controlled to disconnect the first electrode of the first photosensitive element from one terminal of the first capacitor. In this case, in the time period when the third on-off sub-circuit is in the on state, all of the photocurrent may be used to charge the first capacitor; in the time period when the second on-off sub-circuit is in the on state, the electrical signal for charging the charging sub-circuit is completely from the first capacitor, thereby further improving the efficiency in charging the battery.

Figure 12:
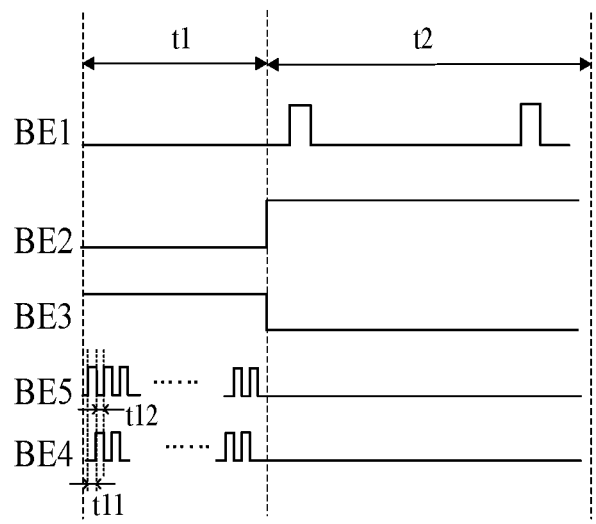
FIG. 12 is a sequence diagram of a process for driving a charging circuit according to an embodiment of the present disclosure.

FIG. 12 is a sequence diagram of a process of driving a charging circuit according to an embodiment of the present disclosure. A principle of driving the charging circuit provided by the embodiment of the present disclosure is described below in detail by taking the charging circuit shown in FIG. 10 as an example, where a high level is a valid level and a low level is an invalid level.

As shown in FIG. 12, at the first charging sub-stage t11 of the charging stage t1, the first control signal provided by the first control signal terminal BE1 is at the low level, the second control signal provided by the second control signal terminal BE2 is at the low level, the third control signal provided by the third control signal terminal BE3 is at the high level, the fourth control signal provided by the fourth control signal terminal BE4 is at the low level, and the fifth control signal provided by the fifth control signal terminal BE5 is at the high level. The first transistor T1 is off under the action of the first control signal. The second transistor T2 is off under the action of the second control signal. The third transistor T3 is on under the action of the third control signal, and a plurality of texture detection circuits 10 connected in series in the charging circuit are connected via third transistors T3 each located between two texture detection circuits 10, so that the photosensitive element in each texture detection circuit 10 provides photocurrent to the first electrode of the fifth transistor T5. The fifth transistor T5 is on under the action of the fifth control signal, and the photocurrents from the first photosensitive elements 101 flow through the fifth transistor T5 and charge the first capacitor C1. Further, the fourth transistor T4 is off under the action of the fourth control signal, so that all of the photocurrents from the first photosensitive elements 101 are used to charge the first capacitor C1.

As shown in FIG. 12, at the second charging sub-stage t12 of the charging stage t1, the first control signal is at the low level, the second control signal is at the low level, the third control signal is at the high level, the fourth control signal is at the high level, and the fifth control signal is at the low level. The first transistor T1 keeps off under the action of the first control signal. The second transistor T2 keeps off under the action of the second control signal. The third transistor T3 keeps on under the action of the third control signal, and a plurality of texture detection circuits 10 connected in series in the charging circuit are connected via third transistors T3 each located between two texture detection circuits 10. The fifth transistor T5 is off under the action of the fifth control signal, and no longer charges the first capacitor C1. The fourth transistor T4 is on under the action of the fourth control signal, and the first capacitor C1 charges the battery through the fourth transistor T4.

As shown in FIG. 12, at the texture detection stage t2, the first control signal is at the high level, the second control signal is at the high level, the third control signal is at the low level, the fourth control signal is at the low level, and the fifth control signal is at the low level. The second transistor T2 is on under the action of the second control signal to connect the second electrode of the first photosensitive element 101 with the reverse power end VSS. Under the action of a power signal of the reverse power end VSS, the first photosensitive element 101 is used to detect an optical signal and convert the optical signal into the photocurrent. The first transistor T1 is on under the action of the first control signal to enable the first electrode of the first photosensitive element 101 to output the photocurrent to the signal readout line R through the first transistor T1, so that the controller 60 realizes fingerprint detection based on the photocurrent. Further, since the fifth transistor T5 is off under the action of the fifth control signal, the first photosensitive element 101 no longer outputs the photocurrent to the first capacitor C1, and each third transistor T3 is off under the action of the third control signal, so that signals of different texture detection circuits 10 may not affect each other, thereby ensuring an accuracy of fingerprint detection. Correspondingly, the fourth transistor T4 is off under the action of the fourth control signal, thereby ensuring stability of a battery voltage.

It is to be noted that, the charging circuit may enter the texture detection stage when there is a touch operation on the surface of the touch display panel. Further, since the first capacitor C1 is limited in capacity, the above first charging sub-stage and the above second charging sub-stage may be performed in turn at the charging stage to charge the battery.

In embodiments of the present disclosure, specific level values of signals of different power ends and signal terminals may be adjusted according to actual circuit needs. Further, in the above embodiments, descriptions are all made with the above transistors being N-type transistors as an example. Certainly, the above transistors may alternatively be P-type transistors. When the above transistors are P-type transistors, level changes of different signal terminals may be opposite to level changes shown in FIG. 12.

In summary, in the method for driving the charging circuit provided by embodiments of the present disclosure, the second electrode of the first photosensitive element is connected with the charging sub-circuit, and after the first photosensitive element converts the optical signal into the electrical signal, the electrical signal may be provided to the charging sub-circuit to enable the charging sub-circuit to store the electrical signal in the form of electric energy. That is, at the texture detection stage, the electrical signal output by the first photosensitive element is used for texture detection; at the charging stage, the electrical signal output by the first photosensitive element is used for charging. Compared with related arts, the utilization rate of the first photosensitive element can be improved on one hand, and the optical energy can be converted into the electric energy on the other hand, thereby improving the utilization rate of the optical energy. Moreover, when the electric energy is provided to a touch display panel for use, an electric energy requirement of the touch display panel on an external power supply can be reduced. Further, when the touch display panel is a display panel in a mobile terminal, an endurance capacity of the mobile terminal can be improved by converting the optical energy into the electric energy for the mobile terminal to use.

An embodiment of the present disclosure provides a touch display panel, and the touch display panel may include a charging circuit and a plurality of pixel units arranged in an array. The charging circuit may be the charging circuit provided by embodiments of the present disclosure. The charging circuit may include a texture detection circuit. The texture detection circuit is disposed in a part of the pixel units, or texture detection circuits are disposed in all of the pixel units. Further, the texture detection circuit may be embedded in the pixel unit.

Figure 13:
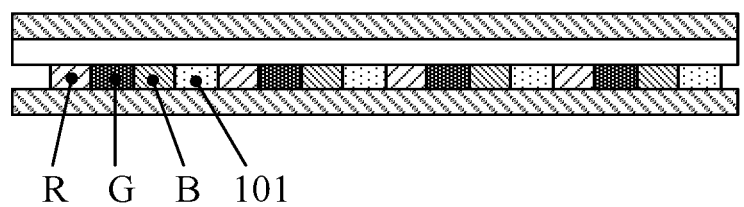
FIG. 13 is a structural schematic diagram of a pixel unit according to an embodiment of the present disclosure.

Optionally, the texture detection circuit may be disposed in each pixel unit, and the texture detection circuits in a plurality of pixel units may be connected in series. At this time, a photosensitive element may be disposed in each pixel unit. Exemplarily, as shown in FIG. 13, a red sub-pixel R, a green sub-pixel G, a blue sub-pixel B and a first photosensitive element 101 may be disposed side by side in each pixel unit.

Further, the touch display panel may further include a controller 60, and the charging circuit may further include a sensing sub-circuit 50, a second on-off sub-circuit and a third on-off sub-circuit. The sensing sub-circuit 50 is configured to sense a light intensity of ambient light in an environment where the charging circuit is located and output a light intensity sensing signal to the controller 60 based on the light intensity. The controller 60 is configured to control a time period when the third on-off sub-circuit is in an on state and a time period when the second on-off sub-circuit is in an on state based on the light intensity sensing signal.

The touch display panel may be any product or component with a display function, such as an LCD panel, an electronic paper, an organic light-emitting diode (OLED) panel, a mobile phone, a tablet computer, a television, a display, a laptop, a digital photo frame and a navigator.

Figure 14:
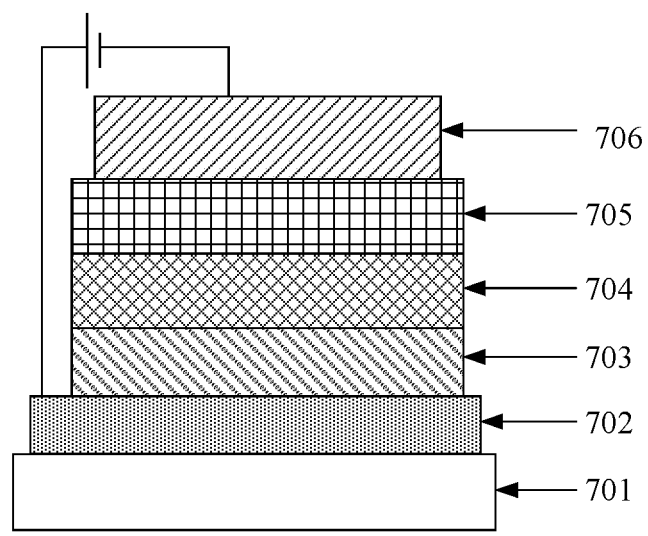
FIG. 14 is a structural schematic diagram of a sub-pixel including an organic light-emitting diode (OLED) according to an embodiment of the present disclosure.

Optionally, the sub-pixel may include an OLED. As shown in FIG. 14, the OLED may include an anode 702, a hole transporting layer 703, a light emitting layer 704, an electron transporting layer 705 and a cathode 706 which are disposed sequentially on a substrate 701. By applying a voltage between the anode 702 and the cathode 706, an electric current may be generated in the OLED, so that the light emitting layer 704 emits light. The anode 702 may be made of indium tin oxide (ITO).

Figure 15:
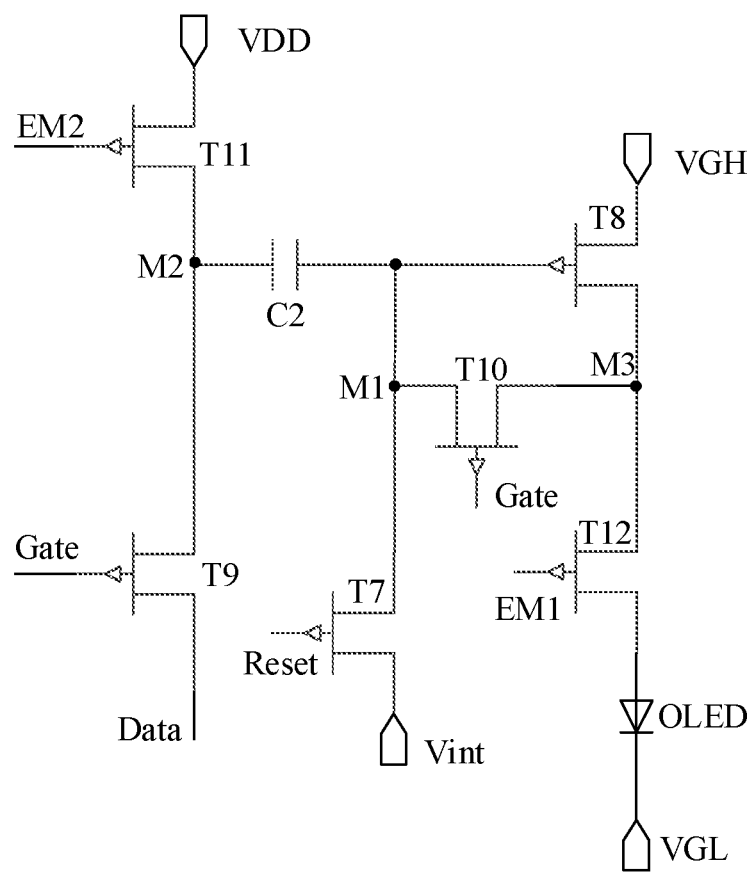
FIG. 15 is a structural schematic diagram of a pixel driving circuit according to an embodiment of the present disclosure.
Figure 16:
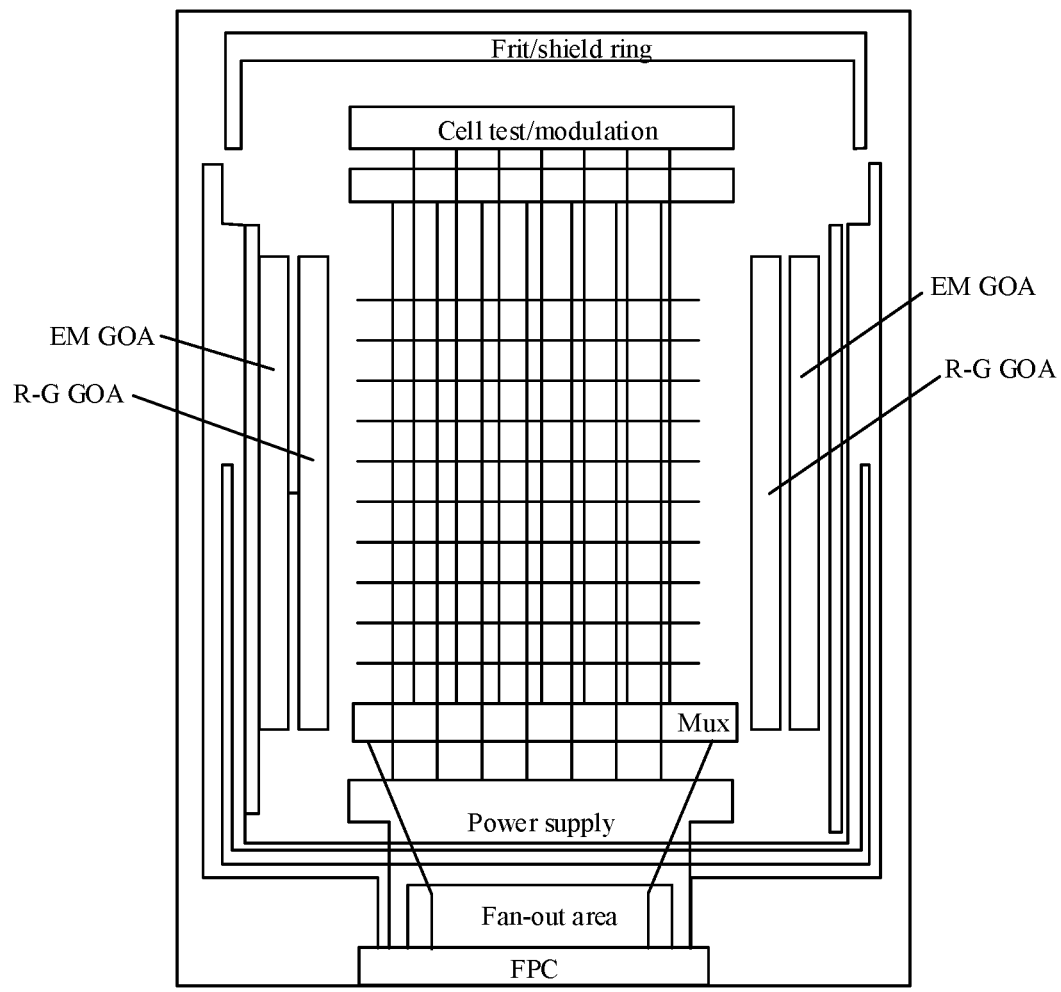
FIG. 16 is a structural schematic diagram of a display device according to an embodiment of the present disclosure.

Further, a pixel driving circuit may drive the sub-pixel to emit light. Exemplarily, FIG. 15 is a structural schematic diagram of a pixel driving circuit according to an embodiment of the present disclosure. As shown in FIG. 15, the pixel driving circuit may include six transistors, i.e., a seventh transistor T7 to a twelfth transistor T12, and a second capacitor C2. The pixel driving circuit is connected with a gate line Gate, a data line Data, a reset signal line Reset, a first light-emitting signal line EM1 and a second light-emitting signal line EM2. Signals loaded on the gate line Gate and the reset signal line Reset may be provided by a reset-gate driving circuit (R-G GOA) in a display device. Signals loaded on the first light-emitting signal line EM1 and the second light-emitting signal line EM2 may be provided by a light-emitting gate driving circuit (EM GOA) in the display device. A signal loaded on the data line Data may be provided by a flexible printed circuit (FPC). Further, positions of the R-G GOA, the EM GOA, the FPC, a fan-out area and a multiplexer (Mux), and a power supply, a cell test/modulation and a frit/shield ring in the display device are schematically shown in FIG. 16.

Further referring to FIG. 15, a working process of the pixel driving circuit may include a reset stage, a charging stage, a compensation stage and a light emission stage. Working principles of the four working stages are described below.

At the reset stage, a reset signal loaded on the reset signal line Reset is at the valid level, a second power signal output by a second power end Vint is at the invalid level, the seventh transistor T7 is turned on under the control of the reset signal, and the second power end Vint inputs the second power signal to a first node M1 through the seventh transistor T7 to reset the first node M1. At this time, the eighth transistor T8 is off under the control of the first node M1.

At the charging stage, a gate signal loaded on the gate line Gate is at the valid level, a data signal loaded on the data line Data is at the valid level Vdata, the ninth transistor T9 is turned on under the control of the gate signal, and the data line inputs the data signal to a second node M2 through the ninth transistor T9, so that the level of the second node M2 is changed to Vdata. At this time, a voltage of the first node M1 changes accordingly under the coupling of the second capacitor C2. The eighth transistor T8 is turned on under the drive of the first node M1, and a third power end VGH inputs a third power signal from the third power end VGH to a third node M3 through the eighth transistor T8. Further, the tenth transistor T10 is turned on under the control of the gate signal, and the third node M3 inputs the third power signal to the first node M1 through the tenth transistor T10, so that the level of the first node M1 is finally controlled to be Vdd−Vth. Vdd refers to a voltage amplitude of the third power signal, and Vth refers to a turn-on voltage amplitude of the eighth transistor T8.

At the compensation stage, a second light emitting signal loaded on the second light emitting signal line EM2 is at the valid level, the eleventh transistor T11 is turned on under the control of the second light emitting signal, and a fourth power end VDD inputs a fourth power signal to the second node M2 through the eleventh transistor T11, so that the level of the second node M2 is changed to Vdd. Vdd refers to a voltage amplitude of the fourth power signal. Correspondingly, the level of the first node M1 is changed to 2Vdd−Vdata−Vth under the coupling of the second capacitor C2.

At the light emission stage, a first light emitting signal loaded on the first light emitting signal line EM1 is at the valid level, and the twelfth transistor T12 is turned on under the control of the first light emitting signal. Further, the level of the first node M1 is maintained at 2Vdd−Vdata−Vth, and the eighth transistor T8 is turned on under the drive of the first node M1. The third power end VGH inputs the third power signal into the OLED through the eighth transistor T8 and the twelfth transistor T12 to control the OLED to emit light. At this time, the magnitude of the electric current flowing through the OLED is I=0.5×K×(Vgs−Vtb)$^2$=0.5×K×[Vdd−(2Vdd−Vdata−Vth)−Vth]$^2$=0.5×K×[Vdd+Vdata]$^2$. K refers to a parameter reflecting structural characteristics of the twelfth transistor T12, and may reflect electron mobility, equivalent capacitance and a width-to-length ratio of a conducting channel, and the like of the twelfth transistor T12. It can be seen from the above formula that the magnitude of the electric current flowing through the OLED is not related to Vth. Therefore, when using the pixel driving circuit shown in FIG. 15 to drive the OLED to emit light, an impact of the turn-on voltage amplitude Vth of the transistor on the magnitude of the electric current generated due to a manufacturing process can be eliminated, so that the OLED may emit light more stably.

In summary, with the touch display panel provided by embodiments of the present disclosure, the second electrode of the first photosensitive element is connected with the charging sub-circuit, and after the first photosensitive element converts the optical signal into the electrical signal, the electrical signal may be provided to the charging sub-circuit to enable the charging sub-circuit to store the electrical signal in the form of electric energy. That is, at the texture detection stage, the electrical signal output by the first photosensitive element is used for texture detection; at the charging stage, the electrical signal output by the first photosensitive element is used for charging. Compared with related arts, the utilization rate of the first photosensitive element can be improved on one hand, and the optical energy can be converted into the electric energy on the other hand, thereby improving the utilization rate of the optical energy. Moreover, when the electric energy is provided to the touch display panel for use, an electric energy requirement of the touch display panel on an external power supply can be reduced. Further, when the touch display panel is a display panel in a mobile terminal, an endurance capacity of the mobile terminal can be improved by converting the optical energy into the electric energy for the mobile terminal to use.

An embodiment of the present disclosure further provides a storage medium storing a computer program therein. The computer program, when being run by a processor, performs the method for controlling a texture detection circuit provided by embodiments of the present disclosure.

The foregoing descriptions are merely preferred embodiments of the present disclosure, and are not intended to limit the present disclosure. Any modifications, equivalent substitutions, improvements, and the like made within the spirit and principles of the present disclosure shall fall within the scope of protection of the present disclosure.

What is claimed is:

1. A charging circuit, comprising a charging sub-circuit and a plurality of texture detection circuits connected in series, wherein
   each texture detection circuit comprises a first photosensitive element and a switching sub-circuit; a first electrode of the first photosensitive element is connected with a signal readout line, and a second electrode of the first photosensitive element is connected with the switching sub-circuit; and the switching sub-circuit is connected with a reverse power end and a charging sub-circuit, and the switching sub-circuit is configured to switch a connection state of the second electrode of the first photosensitive element between a first connection state and a second connection state, wherein the first connection state is a state in which the second electrode of the first photosensitive element is connected with the reverse power end, and the second connection state is a state in which the second electrode of the first photosensitive element is connected with the charging sub-circuit;
   in the plurality of texture detection circuits connected in series, the switching sub-circuit in a first texture detection circuit is connected with the charging sub-circuit, and other switching sub-circuits are connected with the charging sub-circuit through the texture detection circuits connected in series between the other switching sub-circuits and the charging sub-circuit;
   wherein the first texture detection circuit is any texture detection circuit located at both ends of the plurality of texture detection circuits connected in series, other switching sub-circuits are switching sub-circuits in other texture detection circuits, and the other texture detection circuits are texture detection circuits in the plurality of texture detection circuits connected in series other than the first texture detection circuit;
   the texture detection circuit is configured to provide an electrical signal to the charging sub-circuit, wherein the electrical signal is acquired after the first photosensitive element converts a detected optical signal; and the charging sub-circuit is configured to store the electrical signal in form of electric energy.

2. The charging circuit according to claim 1, further comprising a second on-off sub-circuit and a first capacitor, wherein the second on-off sub-circuit is connected in series between the first electrode of the first photosensitive element and the charging sub-circuit;

one terminal of the first capacitor is connected in series between the first electrode of the first photosensitive element and the second on-off sub-circuit, the other terminal of the first capacitor is connected with a first power end, and the first capacitor is configured to: get charged by the electrical signal from the first electrode of the first photosensitive element when the second on-off sub-circuit is in an off state, and discharge to the charging sub-circuit when the second on-off sub-circuit is in an on state.

3. The charging circuit according to claim 2, wherein the second on-off sub-circuit comprises a fourth transistor;

a gate of the fourth transistor is connected with a fourth control signal terminal, a first electrode of the fourth transistor is connected with the first electrode of the first photosensitive element, and a second electrode of the fourth transistor is connected with the charging sub-circuit.

4. The charging circuit according to claim 2, further comprising a third on-off sub-circuit, wherein the third on-off sub-circuit is connected in series between the first electrode of the first photosensitive element and one terminal of the first capacitor.

5. The charging circuit according to claim 4, wherein the third on-off sub-circuit comprises a fifth transistor;

a gate of the fifth transistor is connected with a fifth control signal terminal, a first electrode of the fifth transistor is connected with the first electrode of the first photosensitive element, and a second electrode of the fifth transistor is connected with one terminal of the first transistor.

6. The charging circuit according to claim 4, further comprising a sensing sub-circuit, wherein the sensing sub-circuit is configured to sense a light intensity of ambient light in an environment where the charging circuit is located and output a light intensity sensing signal to a controller based on the light intensity, so that the controller controls, based on the light intensity sensing signal, time periods when one or more of the third on-off sub-circuit and the second on-off sub-circuit are in the on state.

7. The charging circuit according to claim 6, wherein the sensing sub-circuit comprises a second photosensitive element.

8. The charging circuit according to claim 1, wherein the charging sub-circuit comprises a battery.

9. A touch display panel, comprising a charging circuit and a plurality of pixel units arranged in an array, wherein the charging circuit is the charging circuit according to claim 1;

wherein the charging circuit comprises a texture detection circuit, and the texture detection circuit is disposed in a part of the pixel units or texture detection circuits are disposed in all of the pixel units.

10. The touch display panel according to claim 9, wherein the texture detection circuit is disposed in each pixel unit, and the texture detection circuits in the plurality of pixel units are connected in series.

11. The touch display panel according to claim 9, further comprising a controller, wherein the charging circuit further comprises a sensing sub-circuit, a second on-off sub-circuit and a third on-off sub-circuit;

the sensing sub-circuit is configured to sense a light intensity of ambient light in an environment where the charging circuit is located and output a light intensity sensing signal to the controller based on the light intensity; and the controller is configured to control, based on the light intensity sensing signal, time periods when one or more of the third on-off sub-circuit and the second on-off sub-circuit are in an on state.

12. The charging circuit according to claim 1, wherein the switching sub-circuit comprises a second transistor and a third transistor;

a gate of the second transistor is connected with a second control signal terminal, a first electrode of the second transistor is connected with the reverse power end, and a second electrode of the second transistor is connected with the second electrode of the first photosensitive element;

a gate of the third transistor is connected with a third control signal terminal, a first electrode of the third transistor is connected with the second electrode of the first photosensitive element, and a second electrode of the third transistor is connected with the charging sub-circuit.

13. The charging circuit according to claim 1, wherein the texture detection circuit further comprises a first on-off sub-circuit, wherein the first on-off sub-circuit is connected in series between the first electrode of the first photosensitive element and the signal readout line.

14. The charging circuit according to claim 13, wherein the first on-off sub-circuit comprises a first transistor;

a gate of the first transistor is connected with a first control signal terminal, a first electrode of the first transistor is connected with the first electrode of the first photosensitive element, and a second electrode of the first transistor is connected with the signal readout line.

15. A method for driving a charging circuit, wherein the charging circuit comprises a charging sub-circuit and a texture detection circuit, the texture detection circuit comprises a first photosensitive element and a switching sub-circuit, and the method for driving the charging circuit comprises:

at a charging stage, controlling the switching sub-circuit to connect a second electrode of the first photosensitive element with the charging sub-circuit, so that the first photosensitive element provides an electrical signal to the charging sub-circuit and the charging sub-circuit stores the electrical signal in form of electric energy, wherein the electrical signal is acquired after the first photosensitive element coverts a detected optical signal;

the charging circuit further comprises a first capacitor, a third on-off sub-circuit and a second on-off sub-circuit, the third on-off sub-circuit and the second on-off sub-circuit are sequentially connected in series between a first electrode of the first photosensitive element and the charging sub-circuit, one terminal of the first capacitor is connected in series between the third on-off sub-circuit and the second on-off sub-circuit, and the charging stage comprises a first charging sub-stage and a second charging sub-stage;

the method for driving the charging circuit further comprises:

at the first charging sub-stage, the third on-off sub-circuit is controlled to connect the first electrode of the first photosensitive element with one terminal of the first capacitor, so that the first photosensitive element charges the first capacitor;

at the second charging sub-stage, the second on-off sub-circuit is controlled to connect one terminal of the first capacitor with the charging sub-circuit, so that the first capacitor discharges to the charging sub-circuit;

wherein a time period when the third on-off sub-circuit is in an on state and a time period when the second on-off sub-circuit is in an on state are non-overlapping.

16. The method for driving the texture detection circuit according to claim 15, wherein the method further comprises a texture detection stage;

at the texture detection stage, the switching sub-circuit is controlled to connect a second electrode of the first photosensitive element with a reverse power end.

17. The method according to claim 16, wherein the texture detection circuit further comprises a first on-off sub-circuit, and the method driving the texture detection circuit further comprises:

at the texture detection stage, controlling the first on-off sub-circuit to connect a first electrode of the first photosensitive element with a signal readout line; and at the charging stage, controlling the first on-off sub-circuit to disconnect the first electrode of the first photosensitive element from the signal readout line.

* * * * *